US011898721B2

(12) United States Patent
Sinphay et al.

(10) Patent No.: US 11,898,721 B2
(45) Date of Patent: Feb. 13, 2024

(54) FIRE RATED CANLESS RECESSED LUMINAIRE

(71) Applicant: Hubbell Incorporated, Shelton, CT (US)

(72) Inventors: Anthony Sinphay, Greenville, SC (US); Dhavalkumar Patel, Greer, SC (US); William Thomas, Greenville, SC (US)

(73) Assignee: Progress Lighting, LLC, Greenville, SC (US)

( * ) Notice: Subject to any disclaimer, the term of this patent is extended or adjusted under 35 U.S.C. 154(b) by 0 days.

(21) Appl. No.: 17/642,866

(22) PCT Filed: Sep. 16, 2020

(86) PCT No.: PCT/US2020/051039
§ 371 (c)(1),
(2) Date: Mar. 14, 2022

(87) PCT Pub. No.: WO2021/055450
PCT Pub. Date: Mar. 25, 2021

(65) Prior Publication Data
US 2022/0397248 A1 Dec. 15, 2022

Related U.S. Application Data

(60) Provisional application No. 62/900,946, filed on Sep. 16, 2019.

(51) Int. Cl.
*F21S 8/02* (2006.01)
*F21V 25/12* (2006.01)
*F21Y 115/10* (2016.01)

(52) U.S. Cl.
CPC ............ *F21S 8/026* (2013.01); *F21V 25/125* (2013.01); *F21Y 2115/10* (2016.08)

(58) Field of Classification Search
CPC ............................... F21S 8/026; F21V 25/125
See application file for complete search history.

(56) References Cited

U.S. PATENT DOCUMENTS 4,754,377 A 6/1988 Wenman
2007/0068099 A1* 3/2007 Kovacs .................. F21V 25/00 52/232
2007/0109796 A1* 5/2007 Johnson .................... F21S 8/02 362/276

(Continued)

FOREIGN PATENT DOCUMENTS

GB 2505614 3/2014

OTHER PUBLICATIONS

PCT/US2020/051039 International Search Report and Written Opinion dated Feb. 3, 2021.

*Primary Examiner* — Christopher E Dunay
(74) *Attorney, Agent, or Firm* — Robinson + Cole LLP

(57) ABSTRACT

A recessed luminaire includes a housing supporting a light emitter, an intumescent material coupled to an outer surface of the housing, and a plate coupled to the housing and to the intumescent material. The housing configured to be positioned at least partially through a ceiling. The housing also includes a stepped surface. The intumescent material has a shape complementary to a shape of the housing. The plate is positioned adjacent to the stepped surface and to an upper surface of the intumescent material.

21 Claims, 9 Drawing Sheets

(56) References Cited

U.S. PATENT DOCUMENTS

| | | | | |
|---|---|---|---|---|
| 2007/0206374 | A1 | 9/2007 | Petrakis et al. | |
| 2008/0151561 | A1 | 6/2008 | Hua | |
| 2016/0146411 | A1* | 5/2016 | Luo | F21V 29/70<br>362/364 |
| 2016/0238225 | A1* | 8/2016 | Rashidi Doust | F21S 8/026 |
| 2017/0045214 | A1* | 2/2017 | Johnson | F21K 9/233 |
| 2019/0013659 | A1* | 1/2019 | Drane | H02G 3/088 |

* cited by examiner

FIRE RATED CANLESS RECESSED LUMINAIRE

RELATED APPLICATIONS

This application claims the benefit to U.S. Provisional Patent Application No. 62/900,946, filed on Sep. 16, 2019, the entire contents of which are incorporated herein by reference for all that is taught.

FIELD

The present disclosure relates to a recessed luminaire and more specifically, to a intumescent material that is self-contained in a canless recessed luminaire.

BACKGROUND

In order to ensure the safety of occupants in residential and/or commercial buildings (e.g., multi-family dwellings), various codes and standards exist to provide fire protection to the structure. Examples include maintaining the same or substantially the same fire rated properties in ceiling holes (e.g., where luminaires are mounted), as those existing for the ceiling itself. By maintaining the same or substantially the same fire rated properties in ceiling holes as the rest of the ceiling, the ceiling, as a whole, is better resistant to fires spreading from floor to floor.

SUMMARY

In one independent embodiment, a recessed luminaire includes a housing supporting a light emitter, an intumescent material coupled to an outer surface of the housing, and a plate coupled to the housing and to the intumescent material. The housing is configured to be positioned at least partially through an aperture in the ceiling. The housing also includes a stepped surface. The intumescent material has a shape complementary to a shape of the housing. The plate is positioned adjacent to the stepped surface and to an upper surface of the intumescent material.

In another embodiment, a recessed luminaire includes an upper housing configured to house a driver, a lower housing coupled to the upper housing, a first intumescent material coupled to the lower housing, and a second intumescent material positioned between the upper housing and the lower housing. The lower housing includes a reflector and a light emitter coupled to the driver. The first intumescent material is positioned radially outside of an outer surface of the reflector.

Other independent aspects of the disclosure may become apparent by consideration of the detailed description, claims and accompanying drawings.

DETAILED DESCRIPTION

Before any independent embodiments of the disclosure are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted", "connected", "supported", and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component or structure may be performed by multiple components/structures in a distributed manner. Likewise, functionality performed by multiple components/structure may be consolidated and performed by a single component or structure. Similarly, a component or structure described as performing particular functionality may also perform additional functionality not described herein. For example, a device or structure that is "configured" in a certain way is configured in at least that way but may also be configured in ways that are not listed.

In general, the present disclosure relates to an intumescent material that is coupled to a canless recessed luminaire. The intumescent material is positioned around the canless luminaire and does not require an additional housing or structure to hold the intumescent material.

Figure 1:
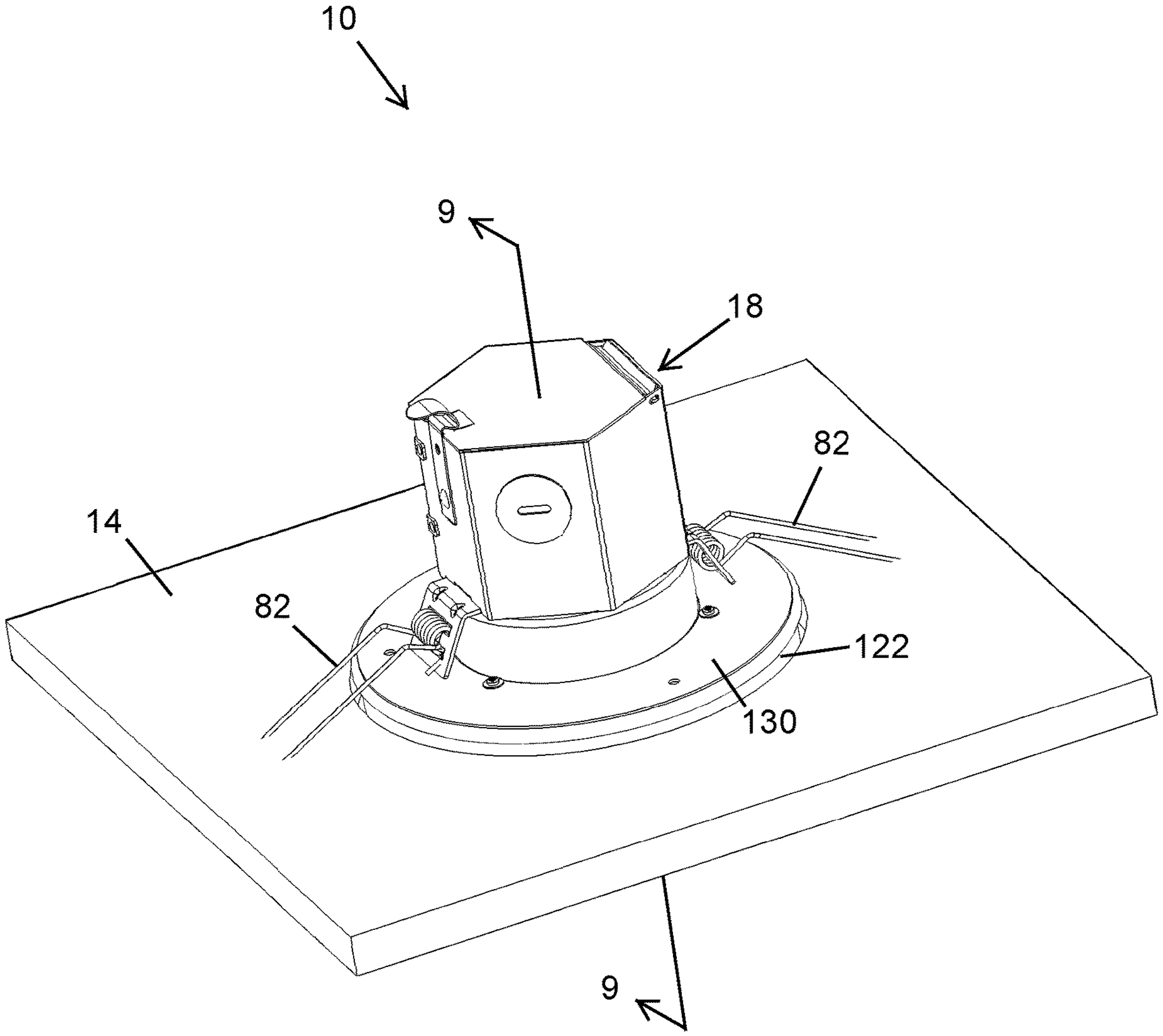
FIG. 1 is a top perspective view of a luminaire.
Figure 2:
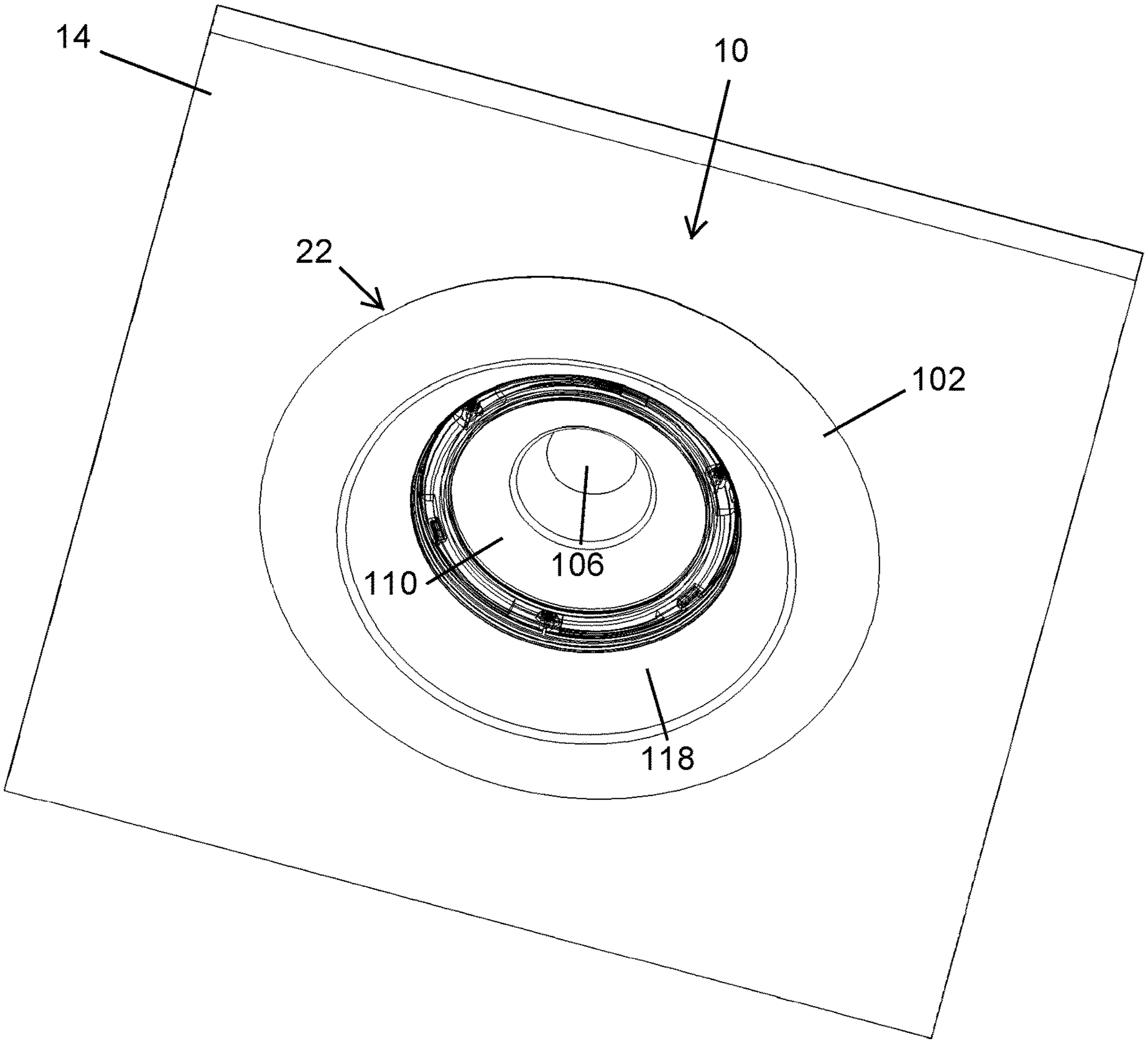
FIG. 2 is a bottom perspective view of the luminaire of FIG. 1.

As shown in FIGS. 1 and 2, a luminaire 10 is mounted to a ceiling 14. The luminaire 10 includes a first or upper housing 18 and a second or lower housing 22. The lower housing 22 is positioned at least partially through the ceiling 14 (see e.g., FIG. 2), and is visible in a room or space beneath the location of the luminaire. The upper housing 18 is coupled to the lower housing 22, and is positioned above the ceiling 14 so as not to be visible from below. In the illustrated embodiment, the luminaire 10 is a canless luminaire. For example, the upper housing 18 and the lower housing 22 are not housed in a common housing. Instead, the upper housing 18 and the lower housing 22 are separate, and may be coupled together in alternate orientations depending on various factors (e.g., shape of the housings, ceiling thickness, space above the ceiling 14, etc.).

Figure 3:
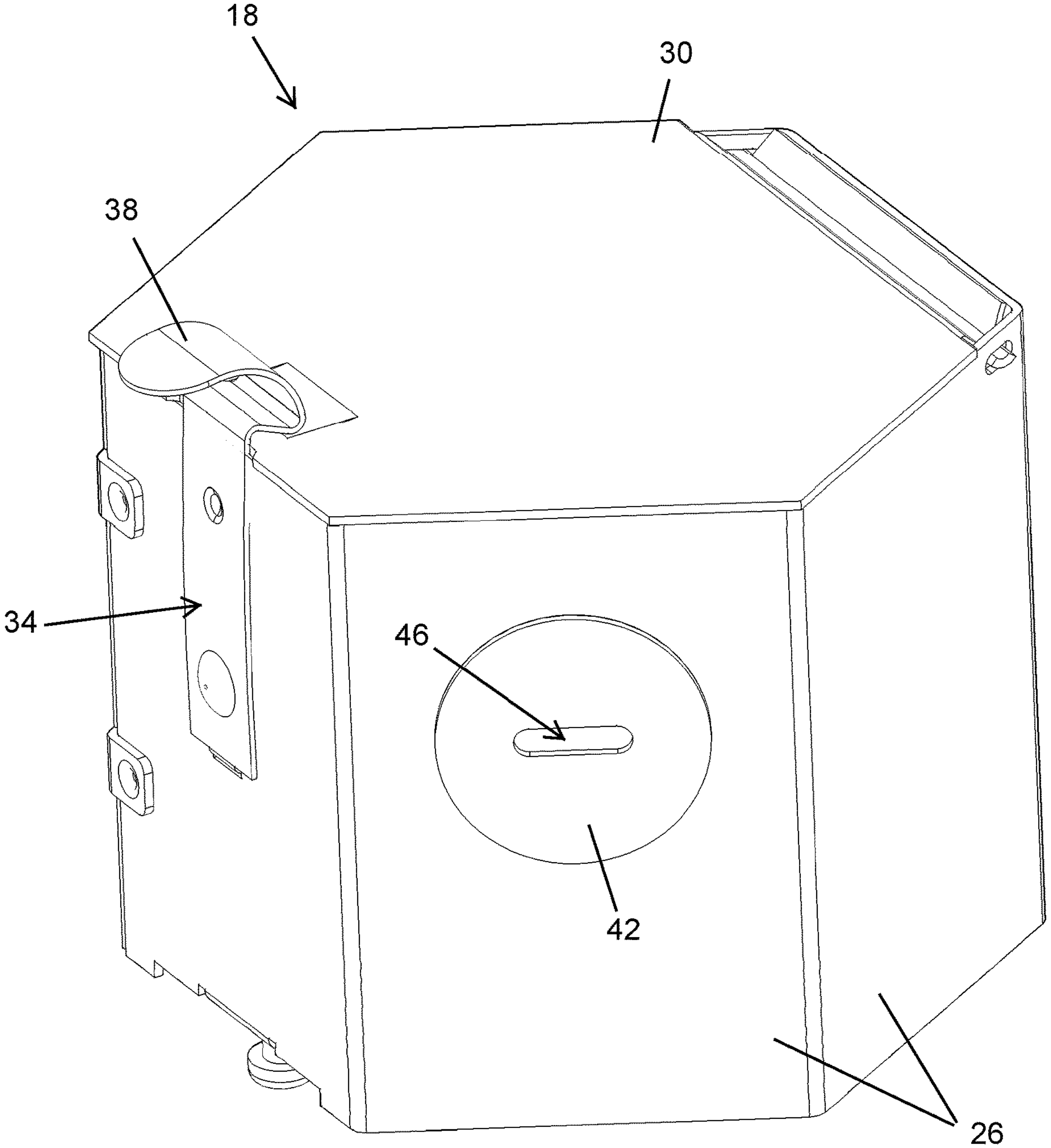
FIG. 3 is a top perspective view of an upper housing of the luminaire of FIG. 1.

As shown in FIG. 3, the upper housing 18 includes side walls 26 that partially define an enclosure. A lid 30 is pivotally coupled to the side walls 26, and selectively moveable between a first or closed position that covers the enclosure, and a second or open position that at least partially exposes the enclosure. In the illustrated embodiment, the side walls 26 are formed from a single piece of material (e.g., a sheet of metal) that is bent or formed to match or complement the shape of the enclosure. Electrical components (e.g., drivers) may be housed in the enclosure.

A bracket 34 is coupled to one of the side walls 26. In the illustrated embodiment, the bracket 34 includes an arcuate section 38. In the closed position, the arcuate portion 38 engages the lid 30, and limits movement of the lid 30 (e.g., toward the open position). A user may actuate (e.g., bend) the arcuate portion 38 in order to release or move the lid 30.

In the illustrated embodiment, the side walls 26 include removable sections or knockouts 42. The knockouts 42 include features 46 that alternatively comprise an opening that allows one or more cables to pass through the side walls 26 and into the enclosure, or comprise a slot that allows the use of a tool to remove knockout 42 (e.g., by applying lateral force to punch it out or rotational force to unscrew it). The knockouts 42 may be removed in order to provide a larger opening (not shown). In other embodiments, the side walls 26 do not include removable section, but may include openings 46 formed directly in the side walls 26.

Figure 4:
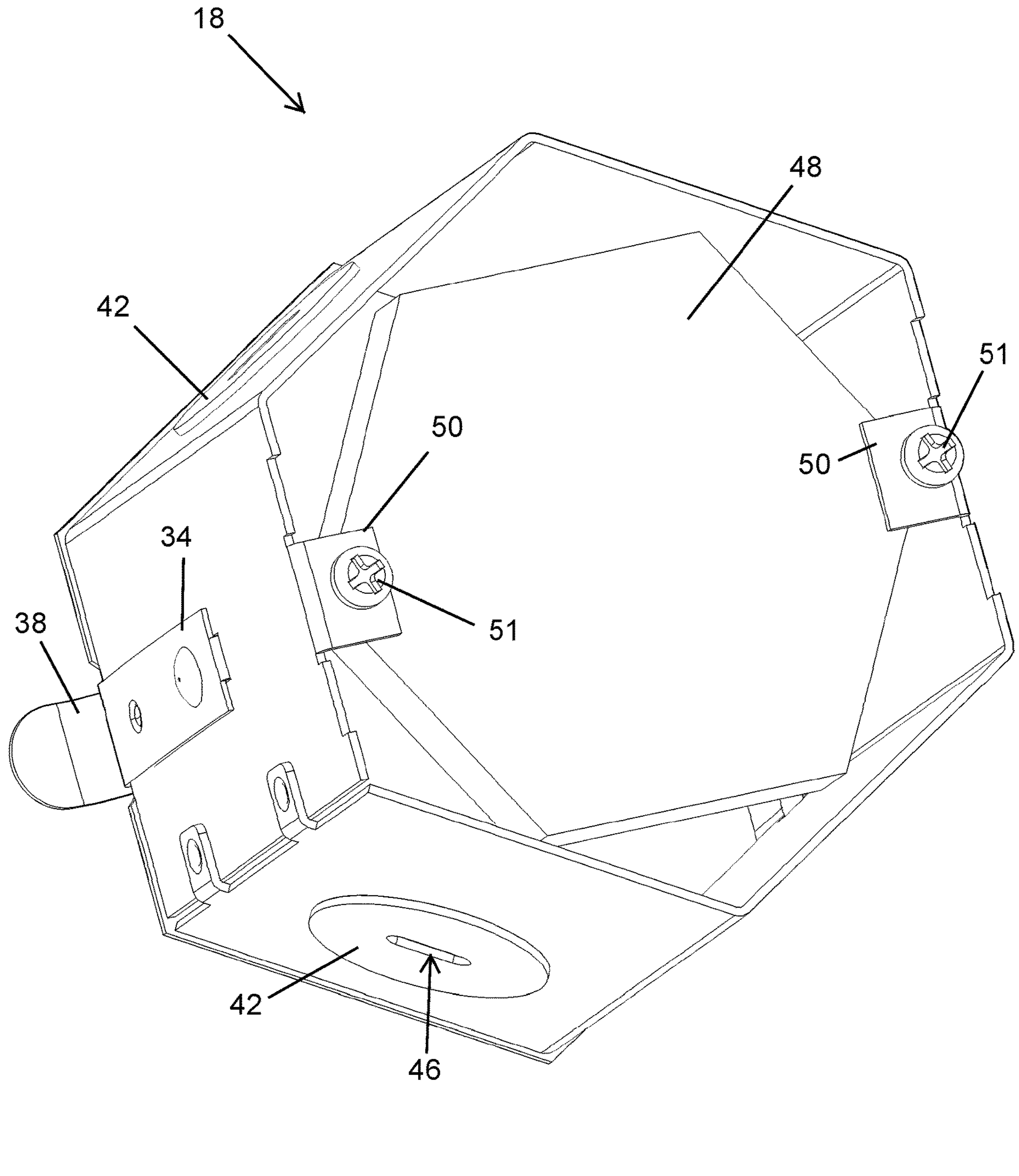
FIG. 4 is a bottom perspective view of the upper housing of the luminaire of FIG. 3.

As shown in FIG. 4, a bottom of the enclosure is partially covered by a first intumescent material 48. In the illustrated embodiment, tabs 50 are coupled to the side walls 26 and are bent toward a center of the enclosure. The first intumescent material 48 in positioned on the tabs 50, and inside of the enclosure. In some embodiments, fastening members 51 (e.g., threaded screws) are inserted through the tabs 50 in order to secure the intumescent material to the tabs 50.

Figure 5:
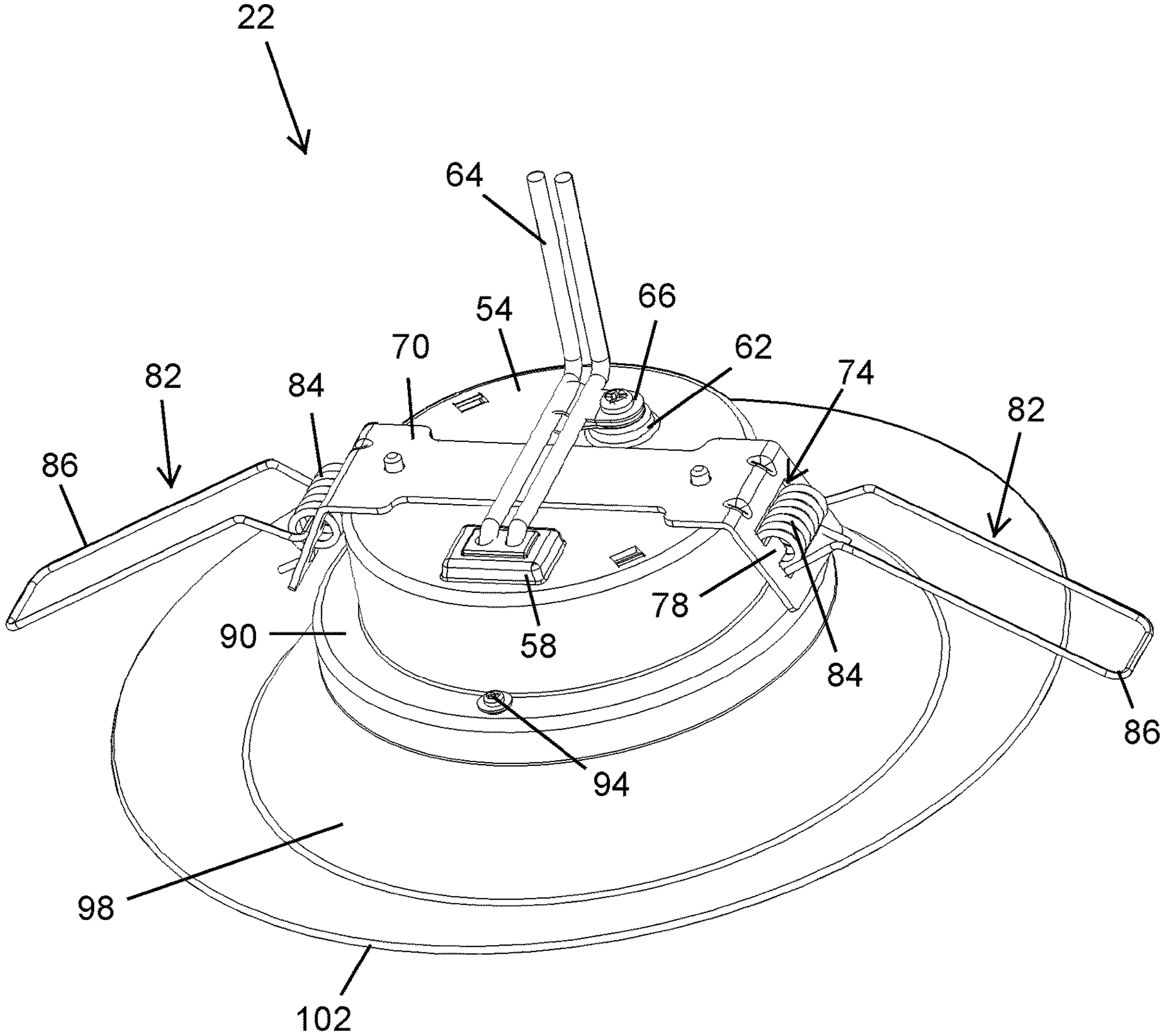
FIG. 5 is a top perspective view of a lower housing of the luminaire of FIG. 1.

As shown in FIG. 5, the lower housing 22 includes an upper surface 54. In the illustrated embodiment, the upper surface 54 includes a first feature 58 and a second feature 62 that extend from the upper surface 54. Wires 64 are configured to extend from inside of the lower housing 22 and through the first feature 58. A bracket 66 is coupled to the second feature 62 in order to partially retain the wires 64 against the upper surface 54.

A mounting bracket 70 is also coupled to the upper surface 54. In the illustrated embodiment, the wires 64 pass over a top of the mounting bracket 70 (i.e., the mounting bracket 70 is positioned between the upper surface 54 and the wires 64). The mounting bracket 70 extends beyond the edges of the upper surface 54. Either side of the mounting bracket 70 includes an opening 74 with a pair of projections 78. A spring 82 is positioned in either opening 74, and retained by the respective pair of projections 78. Each spring 82 includes a coil 84 retained by the respective pair of projections 78, and an elongated body 86 that extends from the respective coil 84. The elongated bodies 86 are resiliently biased by the respective spring 82. In some embodiments, the springs 82 include a protective layer to provide heat resistance and maintain spring constant.

The lower housing 22 also includes a stepped surface 90 spaced apart from the upper surface 54. In the illustrated embodiment, the stepped surface 90 is below the upper surface 54, and is substantially parallel to the upper surface 54. The stepped surface 90 is also generally concentric with the upper surface 54. Fastening apertures 94 are spaced apart along the stepped surface 90.

A bottom portion 98 extends down from the stepped surface 90. In the illustrated embodiment, the bottom portion 98 has a frustoconical shape (e.g., with a circular opening), and is wider than both the stepped surface 90 and the upper surface 54. The bottom portion 98 also includes a lip 102 that extends toward the stepped surface 90. In the illustrated embodiment, the lip 102 is curved, and defines the largest diameter of the lower housing 22. In other embodiments, the bottom portion 98 may have a different shape opening (e.g., a rectangular, a triangular, oblong, etc.).

Figure 6:
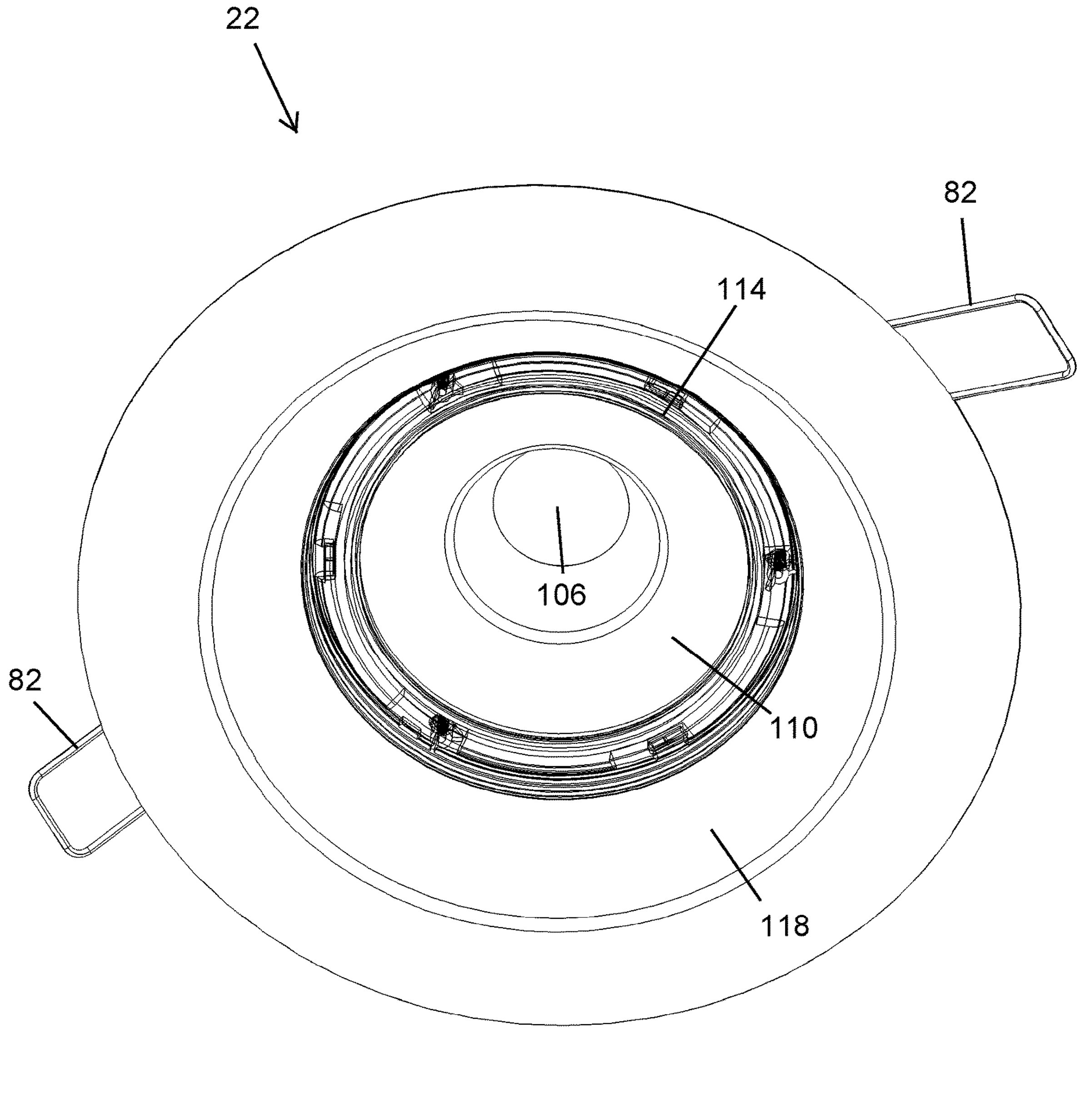
FIG. 6 is a bottom perspective view of the lower housing of the luminaire of FIG. 5.

As shown in FIG. 6, an interior of the lower housing 22 is substantially hollow, and a light emitter 106 is positioned within the lower housing 22. In the illustrated embodiment, the light emitter 106 is coupled to a surface opposite the upper surface 54. The light emitter 106 is also a light emitting diode (LED), although other types of light emitters may be used. In some embodiments, the lower housing 22 includes apertures (not shown). The apertures may generally be positioned between the stepped surface 90 and the lip 102. The apertures may be any shape and may be in any pattern.

Figure 9:
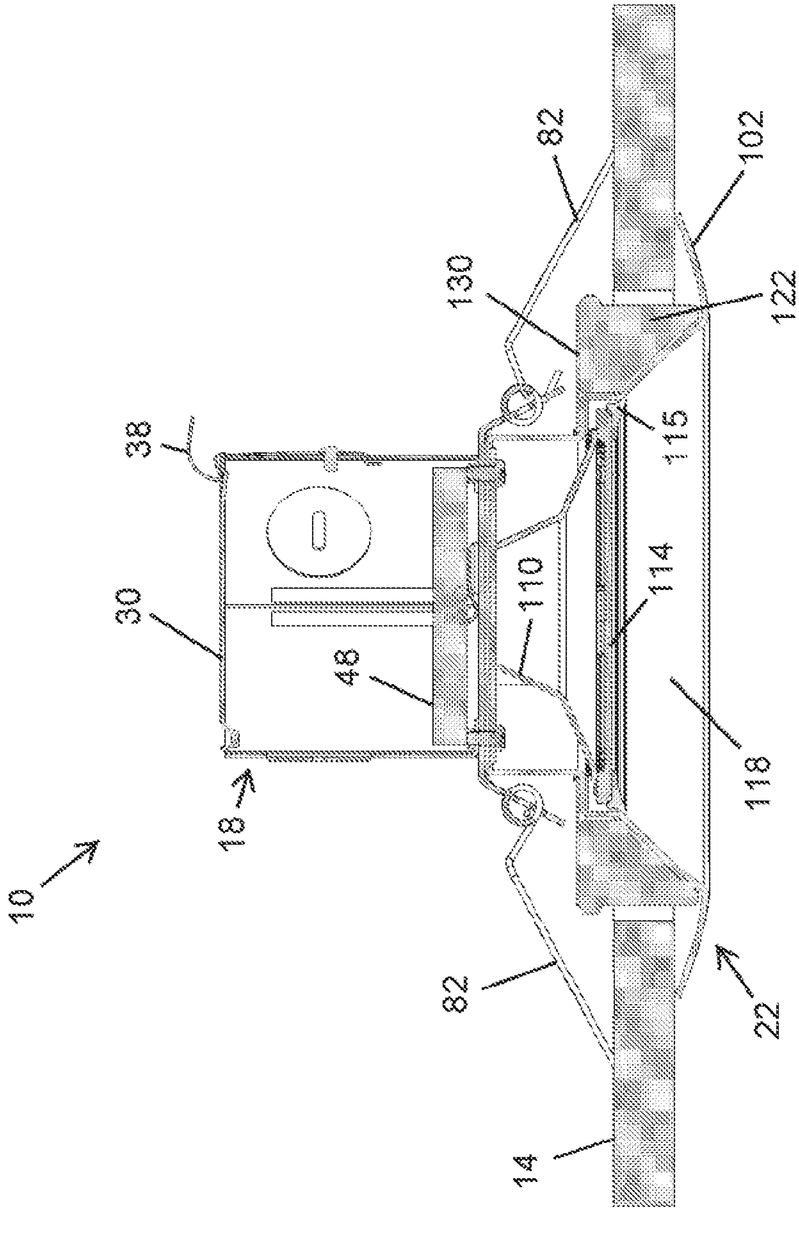
FIG. 9 is a cross sectional view of the luminaire of FIG. 1 viewed along line 9-9.

A reflector 110 is coupled around the light emitter 106 within the lower housing 22. In the illustrated embodiment, the reflector 110 includes a frustoconical shape (e.g., with a circular opening), and extends outwardly toward an inner surface opposite the stepped surface 90 (i.e., is wider further from the light emitter 106). A lens 114 is coupled to a lower end of the reflector 110 (i.e., facing the light emitter 106) by a bezel 115 (FIG. 9). Light emitted by the light emitter 106 may be directed by the reflector 110 and may pass through the lens 114. The inner surface 118 of the lower housing 22 may act as an additional reflector, and further direct light after it passes though the lens 114. In some embodiments, intumescent materials can be incorporated into the bezel 115. In other embodiments, the reflector 110 may have a different shape opening (e.g., a rectangular, a triangular, oblong, etc.).

Figure 7:
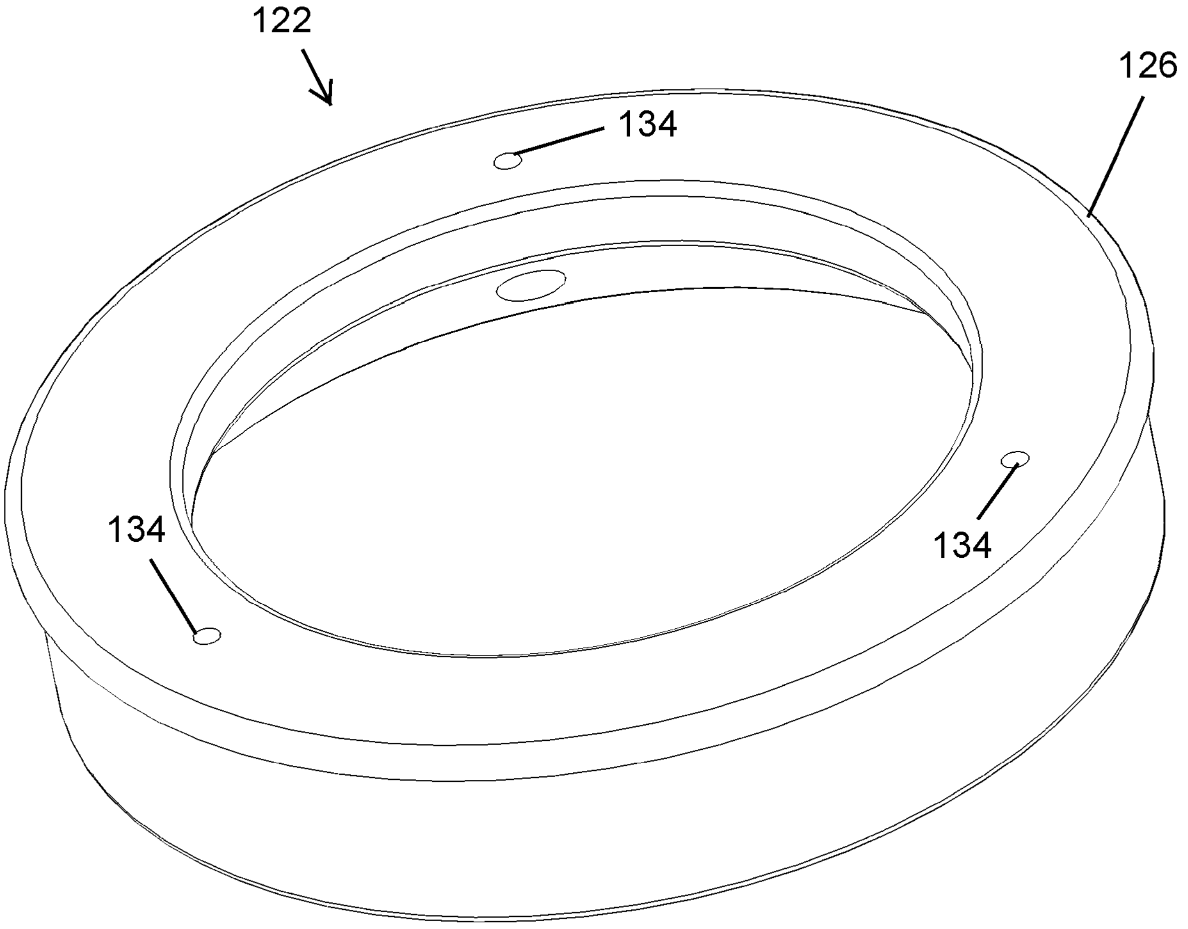
FIG. 7 is a top perspective view of an intumescent material.
Figure 8:
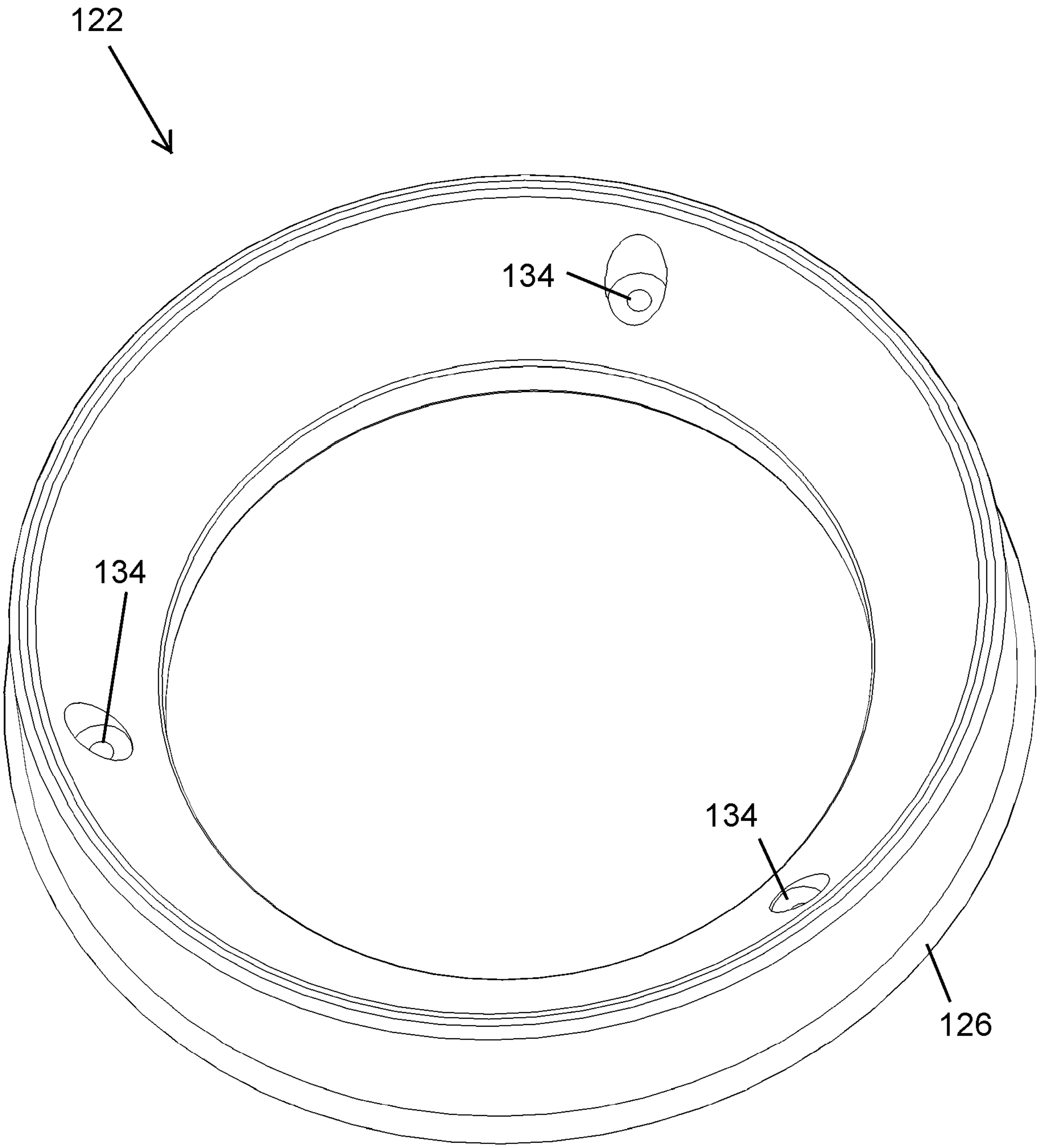
FIG. 8 is a bottom perspective view of the intumescent material of FIG. 7.

Referring to FIGS. 7-9, a second intumescent material 122 is coupled to the lower housing 22 (see e.g., FIG. 9). In the illustrated embodiment, the second intumescent material 122 is positioned approximately coplanar with the stepped surface 90, and extends toward the lip 102. An inner surface of the second intumescent material 122 is shaped substantially similarly with an outer surface of the lower housing 22 (e.g., they have a complementary shape). An outer surface of the second intumescent 122 is substantially straight so as to substantially correspond to the opening in the ceiling 14. In the illustrated embodiment, the second intumescent material 122 includes a lip 126 disposed at an upper end of the second intumescent material 122 (e.g., proximate to the stepped surface 90). The lip 126 has a larger diameter than the opening of the ceiling 14, and may provide resistance for the second intumescent material 122 from moving through the ceiling 14 toward the floor below. The second intumescent material 122 has substantially the same composition as the first intumescent material 48. Although in other embodiments, the first and second intumescent materials 48, 122 may have different chemical compositions. In the illustrated embodiment, the second intumescent material 122 is generally cylindrical in shape, although in other embodiments the second intumescent material 122 may be a different shape (e.g., a sphere, a triangular prism, rectangular prism, etc.).

As shown in FIG. 9, a plate 130 (e.g., a metal plate) is positioned against the stepped surface 90 and contacts the second intumescent material 122. Fasteners (e.g., threaded screws) extend through the fastening apertures 94 to removably secure the plate 130 to the stepped surface 90. The second intumescent material 122 also includes apertures 134 (see e.g., FIG. 8). Fastening members (e.g., threaded screws) extend through the apertures 134 and couple the second intumescent material 122 to the plate 130. In the illustrated embodiment, the plate 130 is generally circular in shape, although in other embodiments the plate 130 may be a different shape (e.g., triangular, rectangular, etc.).

In some embodiments, the plate 130 includes directing openings (not shown) disposed throughout the surface of the plate 130. The directing openings may be any shape and may be disposed in any pattern. In some embodiments, the plate 130 is substantially flat, while in other embodiments, the plate 130 may have any number of angles or curves, or may include any different shape. In some embodiments, the inner perimeter of the plate 130 defines the same shape as the outer perimeter (e.g., circular, triangular, rectangular, etc.). In some embodiments, the inner perimeter and the outer perimeter define different shapes.

The luminaire 10 may be retrofitted into the ceiling 14 (i.e., the luminaire 10 can be installed after ceiling 14 is in place). The luminaire 10 is assembled prior to being installed. In other words, the upper and lower housings 18, 22 are coupled together, and the second intumescent material 122 is coupled to the lower housing 22 prior to the luminaire 10 being positioned in the ceiling 14.

As the luminaire 10 is inserted into the ceiling 14, the springs 82 may be positioned downwardly in order to fit within the opening of the ceiling 14. The second intumescent material 122 may also have resilience in order to allow the lip 126 to fit into the ceiling 14. The luminaire 10 continues to be inserted into the ceiling 14 until the lip 102 of the lower housing 22 contacts the ceiling 14. The springs 82 extend downwardly to contact the ceiling 14. The luminaire 10 is limited by the springs 82 and the lip 102 from further translating into and out of the ceiling 14.

In the event of a fire in the room below the luminaire 10, the components of the luminaire 10 begin to heat up. As a fire intensifies, the upper and lower housings 18, 22 may begin to melt and fall out of the ceiling 14. To fill this hole, and limit the fire from spreading through the weak point in the ceiling 14, the second intumescent material 122 begins to expand and fill in the ceiling hole. The first intumescent material 48 also begins to expand, and may fall on top of the second intumescent material 122 once the lower housing 22 falls out of the ceiling 14. As both intumescent materials 48, 122 expand, the opening in the ceiling 14 closes. The intumescent materials 48, 122 provide substantially the same fire resistant properties as the ceiling 14 (e.g., up to two hours of flame resistance) so that the hole for the luminaire 10 does not create a weak point in the ceiling 14 that could allow the fire to spread.

In some embodiments, the directing openings in the plate 130 and/or contours (e.g., angles, curves, etc.) of the plate 130 can direct the expansion of the second intumescent material 122. The expansion can be directed toward the springs 82 to prevent the springs 82 from heating and losing spring constant. In some embodiments, the apertures in the lower housing 22 can also direct the expansion of the second intumescent material 122 toward the center of the opening (e.g., into cavities within the luminaire 10).

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more independent features and/or independent advantages of the present disclosure may be set forth in the claims.

What is claimed is:

1. A recessed luminaire comprising:

a housing supporting a light emitter and configured to be positioned at least partially through an aperture in a ceiling, the housing including a stepped surface;

an intumescent material directly contacting an outer surface of the housing and having a shape complementary to a shape of the housing, the intumescent material having an upper surface substantially co-planar with the stepped surface along a first plane; and a plate coupled to the housing and to the intumescent material, the plate positioned in contact with the stepped surface and in contact with the upper surface of the intumescent material along the first plane.

2. The recessed luminaire of claim 1, wherein the intumescent material includes an aperture configured to receive a fastener, the fastener configured to secure the plate to the intumescent material.

3. The recessed luminaire of claim 1, wherein the housing is a lower housing and the intumescent material is a first intumescent material, the luminaire further comprising, an upper housing coupled to the lower housing and configured to be positioned within a ceiling, the upper housing configured to support a driver electrically connected to the light emitter; and a second intumescent material positioned within the upper housing, the second intumescent material proximate the lower housing.

4. The recessed luminaire of claim 1, wherein the intumescent material and the plate have a circular shape, each with an inner diameter and an outer diameter.

5. The recessed luminaire of claim 1, wherein:

the intumescent material includes a planar surface that extends from the upper surface and is configured to face the circumference of the aperture;

a lip disposed between the upper surface and the planar surface and extending beyond the planar surface in a radial direction; and the lip configured to have a maximum diameter greater than a diameter of the aperture.

6. The luminaire claimed in claim 1, wherein the plate includes a maximum outer diameter that is less than a maximum outer diameter of the housing.

7. A recessed luminaire comprising:

an upper housing configured to house a driver;

a lower housing coupled to the upper housing, the lower housing including a light emitter coupled to the driver and a reflector;

a first intumescent material directly coupled to the lower housing and positioned radially outside of an outer surface of the reflector; and a second intumescent material positioned between the upper housing and the lower housing.

8. The recessed luminaire of claim 7, further comprising a plate coupled to a stepped surface of the lower housing, the plate extending radially beyond the stepped surface and coupled to the first intumescent material, and wherein the intumescent material includes an aperture configured to receive a fastener, the fastener configured to secure the plate to the intumescent material.

9. The recessed luminaire of claim 7, wherein a width of the second intumescent material is less than an inner diameter of the first intumescent material.

10. The luminaire claimed in claim 7, wherein the lower housing includes an upper surface with a first feature configured to allow conductors to pass between the driver and the light emitter, and wherein the upper housing is coupled to the upper surface of the lower housing.

11. The luminaire claimed in claim 7, wherein the first intumescent material is directly coupled to the first housing, and wherein the second intumescent material is supported on at least one tab positioned adjacent to a top surface of the lower housing.

12. A luminaire for attaching through an aperture in a ceiling or wall of a structure comprising:
- a first housing having a first diameter smaller than the aperture and including a light emitter;
- a first intumescent material directly coupled to an outer surface of said first housing;
- a second housing having a second diameter smaller than said first diameter and coupled to a top surface of said first housing; and
- a second intumescent material coupled to said second housing proximate said top surface of said first housing.

13. The luminaire claimed in claim 12 further comprising:
- an attachment mechanism coupled to one or more of said first and second housings for retaining the luminaire within the aperture.

14. The luminaire claimed in claim 13 further comprising:
- a reflector coupled to said first housing and disposed between said light emitter and the aperture; and
- a lens coupled to said first housing and disposed within an inner diameter of said first intumescent material.

15. The luminaire claimed in claim 14 wherein said first housing includes a lip portion that extends beyond a circumference of the aperture.

16. The luminaire claimed in claim 15 wherein said attachment mechanism includes one or more spring-biased wing portions that contact a first surface of the wall or ceiling and said lip portion contacts a second surface of the wall or ceiling to retain the luminaire within the aperture.

17. The luminaire claimed in claim 12 wherein said first intumescent material is shaped substantially similar to a shape of the aperture.

18. The luminaire claimed in claim 17 wherein said second intumescent material is shaped substantially similar to a shape of the outside diameter of said second housing.

19. The luminaire claimed in claim 12 wherein said second housing includes a lid portion on a surface opposite said first housing, wherein said lid portions provides access to an interior area of said second housing, and wherein a driver is disposed within said second housing and electrically connected to said light emitter.

20. The luminaire claimed in claim 12, wherein the second housing includes at least one tab for supporting the second intumescent material, and wherein a fastener extends through the top surface, the at least one tab, and the second intumescent material to connect the first housing, the second housing, and the second intumescent material together.

21. The luminaire claimed in claim 12, wherein the first intumescent material is directly coupled to the first housing, and wherein the second intumescent material is supported on at least one tab positioned adjacent to the top surface.

* * * * *